United States Patent
Nunn et al.

(10) Patent No.: US 11,195,038 B2
(45) Date of Patent: Dec. 7, 2021

(54) DEVICE AND A METHOD FOR EXTRACTING DYNAMIC INFORMATION ON A SCENE USING A CONVOLUTIONAL NEURAL NETWORK

(71) Applicant: Aptiv Technologies Limited, St. Michael (BB)

(72) Inventors: Christian Nunn, Huckeswagen (DE); Weimeng Zhu, Wuppertal (DE); Yu Su, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 50 days.

(21) Appl. No.: 16/374,138

(22) Filed: Apr. 3, 2019

(65) Prior Publication Data

US 2019/0325241 A1    Oct. 24, 2019

(30) Foreign Application Priority Data

Apr. 23, 2018   (EP) ..................... 18168786

(51) Int. Cl.
   *G06K 9/00*   (2006.01)

(52) U.S. Cl.
   CPC ..... *G06K 9/00979* (2013.01); *G06K 9/00744* (2013.01)

(58) Field of Classification Search
   CPC ........... G06K 9/00724; G06K 9/00744; G06K 9/00791; G06K 9/00805; G06K 9/00979; G06K 9/34; G06K 9/4628; G06K 9/6267; G06T 7/11; G06T 7/194; G06T 7/20; G06T 2207/10016; G06T 2207/10024; G06T 2207/20081; G06T 2207/20084; G06T 2207/30261
   See application file for complete search history.

(56) References Cited

U.S. PATENT DOCUMENTS

| | | | |
|---|---|---|---|
| 9,760,806 B1* | 9/2017 | Ning | G06N 3/0454 |
| 10,701,394 B1* | 6/2020 | Caballero | G06N 3/08 |
| 10,739,773 B2* | 8/2020 | Vernaza | G06K 9/00825 |
| 11,049,018 B2* | 6/2021 | Yang | G06N 3/0481 |

(Continued)

FOREIGN PATENT DOCUMENTS

WO    2016160237    10/2016

OTHER PUBLICATIONS

Chung et al. "A two stream siamese convolutional neural network for person re-identification." Proceedings of the IEEE international conference on computer vision. 2017. (Year: 2017).*

(Continued)

*Primary Examiner* — Katrina R Fujita
(74) *Attorney, Agent, or Firm* — Colby Nipper PLLC

(57) ABSTRACT

A device for extracting dynamic information comprises a convolutional neural network, wherein the device is configured to receive a sequence of data blocks acquired over time, each of said data blocks comprising a multi-dimensional representation of a scene. The convolutional neural network is configured to receive the sequence as input and to output dynamic information on the scene in response, wherein the convolutional neural network comprises a plurality of modules, and wherein each of said modules is configured to carry out a specific processing task for extracting the dynamic information.

20 Claims, 13 Drawing Sheets

(56) References Cited

U.S. PATENT DOCUMENTS

| | | | |
|---|---|---|---|
| 2007/0022063 A1* | 1/2007 | Lightowler | G06N 3/063 706/15 |
| 2017/0193310 A1* | 7/2017 | Yu | G06K 9/6271 |
| 2017/0255832 A1* | 9/2017 | Jones | G06N 3/0454 |
| 2018/0096259 A1* | 4/2018 | Andrews | G06T 7/251 |
| 2018/0211403 A1* | 7/2018 | Hotson | G06T 7/60 |
| 2018/0232947 A1* | 8/2018 | Nehmadi | G01S 17/931 |
| 2019/0042850 A1* | 2/2019 | Jones | G06K 9/00711 |
| 2019/0124346 A1* | 4/2019 | Ren | G06N 3/08 |
| 2019/0171939 A1 | 6/2019 | Zhu et al. | |
| 2019/0325306 A1 | 10/2019 | Zhu et al. | |
| 2019/0347485 A1* | 11/2019 | Yang | G06K 9/00744 |
| 2020/0301013 A1* | 9/2020 | Banerjee | G01S 13/42 |
| 2021/0104086 A1* | 4/2021 | Wang | G06N 3/084 |

OTHER PUBLICATIONS

Du et al. "Recurrent spatial-temporal attention network for action recognition in videos." IEEE Transactions on Image Processing 27.3 (2017): 1347-1360. (Year: 2017).*

Peng et al. "Multi-region two-stream R-CNN for action detection." European conference on computer vision. Springer, Cham, 2016. (Year: 2016).*

Wang et al. "Two-Stream SR-CNNs for Action Recognition in Videos." BMVC. 2016. (Year: 2016).*

Julie Dequaire et al: "Deep tracking in the wild: End-to-end tracking using recurrent neural networks", Jun. 22, 2017, pp. 492-512.

Peter Ondruska et al "Deep Tracking: Seeing Beyond Seeing Using Recurrent Neural Networks", Mar. 8, 2016, 8 pages.

Mohsen Fayyaz et al: "STFCN: Spatio-Temporal FCN for Semantic Video Segmentation", Sep. 2, 2016, 18 pages.

"Extended European Search Report", EP Application No. 17205540. 2, dated Jun. 11, 2018, 10 pages.

"Extended European Search Report", EP Application No. 18168786. 4, dated Oct. 16, 2018, 10 pages.

"Extended European Search Report", EP Application No. 18168781. 5, dated Oct. 29, 2018, 11 pages.

"Foreign Office Action", EP Application No. 17205540.2, dated May 4, 2020, 5 pages.

Cho, "Learning Phrase Representation using RNN Encoder-Decoder for Statistical Machine Translation", Sep. 3, 2014, 15 pages.

Chung, "Empirical Evaluation of Gated Recurrent Neural Networks on Sequence Modeling", Dec. 11, 2014, 9 pages.

Dai, et al., "Deformable Convolutional Networks", Jun. 5, 2017, 12 pages.

Hubel, et al., "Receptive Fields, Binocular Interaction and Functional Architecture in Cat's Visual Cortex", Jul. 1961, pp. 106-154, 51 pages.

Jaderberg, et al., "Spatial Transformer Networks", Feb. 4, 2016, 15 pages.

Long, et al., "Fully Convolutional Networks for Semantic Segmentation", Mar. 8, 2015, 10 pages.

Mclaughlin, et al., "Recurrent Convolutional Network for Video-Based Person Re-Identification", Jun. 27, 2016, pp. 1325-1334, 10 pages.

Patraucean, et al., "Spatio-temporal video autoencoder with differentiable memory", Sep. 1, 2016, 13 pages.

Qi, et al., "PointNet: Deep Learning on Point Sets for 3D Classification and Segmentation", Conference on Computer Vision and Pattern Recognition (CVPR) 2017, Jul. 2017, pp. 652-660, 9 pages.

Ren, et al., "Faster R-CNN: Towards Real-Time Object Detection with Region Proposal Networks", Jan. 6, 2016, 14 pages.

Ronnenberger, et al., "U-Net: Convolutional Networks for Biomedical Image Segmentation", May 18, 2015, 8 pages.

Shi, et al., "Convolutional LSTM Network: A Machine Learning Approach for Precipitation Nowcasting", Sep. 15, 2015, 12 pages.

Tokmakov, "Learning Video Object Segmentation with Visual Memory", Jul. 12, 2017, 11 pages.

Zhou, et al., "VoxelNet: End-to-End Learning for Point Cloud Based 3D Object Detection", Nov. 17, 2017, 10 pages.

"Foreign Office Action", EP Application No. 18168781.5, dated Jun. 4, 2021, 6 pages.

"Foreign Office Action", EP Application No. 18168786.4, dated Sep. 2, 2021, 4 pages.

"Summons to Attend Oral Proceedings", EP Application No. 1720540. 2, Jul. 30, 2021, 6 pages.

* cited by examiner

DEVICE AND A METHOD FOR EXTRACTING DYNAMIC INFORMATION ON A SCENE USING A CONVOLUTIONAL NEURAL NETWORK

TECHNICAL FIELD OF INVENTION

This disclosure generally relates to to the field of data processing by means of a convolutional neural network.

BACKGROUND OF INVENTION

Convolutional neural networks (CNNs) are employed for many applications, especially for applications in which large amounts of data need to be processed for extracting a desired information from the data. For example, the data can represent image or video data which capture one or more objects present in a (real) scene. CNNs have shown to be useful to automatically extract information which characterizes the scene captured by the data more closely, for example information about the position and the motion of objects in the scene. In other words, CNNs can be configured to perform a semantic analysis of the data (i.e., by pattern recognition). As one possible application, a machine can be controlled on the basis of this analysis. The scene can for example be a traffic scene in the surrounding of a vehicle which should be controlled on the basis of an automatic semantic analysis of the traffic scene. This is known as an autonomous driving application.

A CNN is a structural representation of a computer-implemented method for processing data. It comprises processing the data with convolutional kernels which are filter masks comprising a plurality of values (i.e., filter weights) arranged in a predefined pattern. The convolutional kernel is convolved with the input data in order to process the data. A constant may be added to the result of the convolution followed by filtering with a so-called activation function, as is known to those skilled in the field of neural networks. These processing steps may form a structural unit of the CNN often referred to as a convolutional layer. The use of convolutional kernels is helpful for avoiding a modification of the spatial pattern in the input data. Therefore, any input data that has a spatial pattern, e.g., images and videos, can be processed by CNNs. Furthermore, convolutional kernels provide superior efficiency of processing when large amounts of data need to be processed.

A problem of ordinary CNNs is that they are, as such, not configured to process time-dependent data, i.e. sequences of data captured sequentially over time. This is to say that an ordinary CNN assumes a data item, e.g. a "block" of input data, to have one common time stamp, which may be the case for a video frame. Therefore, an input sequence of data items is usually processed sequentially, i.e. by processing one data item after the other. A disadvantage of this approach is that time-dependencies in the data are not explicitly recognized by the CNN.

Time-dependencies are present in most types of real data, for example in data, which represents real scenes, e.g., of a traffic environment. This is because objects, in particular moving objects such as vehicles, pedestrians and the like can only move smoothly because of their speed limitation. Such time dependencies are very important for achieving a robust extraction of the desired information, such as a detection of objects or a classification thereof (image classification). One reason is that (real) data is usually captured under non-optimum conditions. Furthermore, objects can suddenly appear and disappear due to occlusions with other objects. Such phenomena are also known as object birth and object death. Therefore, extracting information from data of complex scenes usually requires the use of temporal information in order to carry out a robust semantic analysis of the data.

There have been efforts towards enabling CNNs to recognize time-dependencies in sequential data, for example in the form of recurrent neural networks (RNN) and long-short-term memories (LSTM). However, it turned out that these types of neural networks are not always powerful enough to cope with complex data such as data representing a scene with many different moving objects. It is understood that this data can be captured by means of a camera. However, in other applications, in particular modern vehicular applications, the data can be captured by other sensors as well, including one or more radar sensors or a light detection and ranging (lidar) system. In connection with these applications, the data usually represents a traffic scene in the surrounding of the vehicle, wherein different types of sensor data may be available for combination. The traffic scene needs to be analysed constantly and reliably from the data in order to enable safe autonomous driving applications. Yet, a robust extraction of the required information has proven difficult with the known types of CNNs.

SUMMARY OF THE INVENTION

In order to solve the above problems a plurality of different CNNs can be employed, wherein each CNN provides a portion of the desired information. These CNNs have to be trained separately although they all provide information which is mostly related to each other. For example, based on raw sensor data multiple CNNs can be used to separately extract information on object detection and free-space of a scene in the field of view of the sensor which have been used for acquiring the raw sensor data. On the basis of the extracted information further information may be generated.

A disadvantage of using multiple CNNs is that they are difficult to combine. Often the various types of information have different data formats, so using and analysing the data together has shown to be challenging. Pre-processing of data and testing different training schemes of the CNNs appears to be not suitable to fully overcome this challenge. Furthermore, using multiple CNNs is often not suitable for extracting reliable dynamic information from the various types of data. In connection to the importance of temporal information mentioned above, effective use of temporal information in the data appears to be limited with standard CNNs.

The problem underlying the invention is to provide a device and a method for extracting reliable dynamic information from a sequence using a CNN.

In one example, the device is configured to receive a sequence of data blocks acquired over time, each of said data blocks comprising a multi-dimensional representation of a scene, wherein the convolutional neural network is configured to receive the sequence as input and to output dynamic information on the scene in response, wherein the convolutional neural network comprises a plurality of modules, and wherein each of said modules is configured to carry out a specific processing task for extracting the dynamic information.

One aspect of the invention is to use one single, i.e. global CNN for extracting the dynamic information. This CNN has a modular structure, wherein each of the modules can be formed by a neural network in which case the modules can be denoted as sub-networks. The approach of the invention is an holistic one, wherein the advantage of dividing a complex processing up into multiple units is maintained, while the disadvantage of having to deal with multiple separated networks is removed. The CNN explicitly takes a sequence of data blocks as input, so an effective extraction of dynamic information, i.e. information that takes into account temporal changes in the sequence, is now possible. The device according to the invention has shown to be powerful in robustly extracting reliable dynamic information and it can easily be integrated into many applications such as an autonomous driving application. The dynamic information is more accurate compared to the case that this data is extracted per block of the sequence because interdependences between the blocks are considered by the CNN. Due to the complex structure of the CNN, it can be denoted as a deep CNN.

The modules can be employed in a row, i.e. in a "pipeline" structure. Although each of the modules is designed to carry out a specific processing task, the overall CNN can be trained in an end-to-end manner, which simplifies preparation of the network and any necessary adaptions.

Preferably, the sequence is formed by raw sensor data, i.e., data acquired by a sensor, wherein the term "raw" means that the data is not pre-processed. This makes the device particularly user-friendly.

Also, preferably, each data block of the sequence comprises a plurality of data points, each of said data points representing a spatial location in the scene. In other words, each data block is composed of an arrangement of data points that provides a spatial characterization of the scene. The data points can be denoted as a point cloud, which means that the data points are directly outputted from a sensor, i.e. raw sensor data. So, the sequence can comprise instances of such point clouds, which have been sequentially acquired at different time instances.

According to one embodiment a first module of the CNN is configured to extract image data of the scene from a data block of the sequence, and wherein the image data is formed by a multi-dimensional, in particular two-dimensional, grid of elements, each of said elements comprising one or more channels. Each element can be a picture element (pixel). The channels can be colour channels as used in known image sensors, e.g. RGB. However, the image data can also comprise channels which represent velocity information. Velocity information can for example be acquired using a radar sensor based on Doppler-radar technology, as is known from the art (i.e., "range rate"). It is noted that the data blocks of the sequence are usually highly dimensional. Therefore, the first module is effectively configured to perform a data reduction to a predefined number of dimensions. The grid is a spatial arrangement of elements with spatial correspondence to the scene. Therefore, the grid can be regarded as an image-like "top view" on the scene.

Preferably, the first module is a neural network which takes data points of a data block as input. The first module is preferably a fully-connected layer neural network.

According to another embodiment a second module is configured to extract first semantic segmentation data of the scene from image data of the scene, wherein the semantic segmentation data comprises a classification of the image data for distinguishing between objects and background captured in the image data. The image data is preferably extracted by the first module. The extraction of the semantic segmentation is preferably carried out per image, e.g. per frame.

The second module is preferably a U-net neural network, which is described in detail in: Olaf Ronneberger, Philipp Fischer, Thomas Brox, "U-Net: Convolutional Networks for Biomedical Image Segmentation", Medical Image Computing and Computer-Assisted Intervention (MICCAI), Springer, LNCS, Vol. 9351: 234-241, 2015.

A third module of the CNN can be provided and configured to extract second semantic segmentation data of the scene and/or motion data of the scene from first semantic segmentation data of the scene, wherein the first semantic segmentation data comprises a classification of image data of the scene for distinguishing between objects and background captured in the image data, and wherein the motion data represents the motion of objects captured in the image data, and wherein the third module is configured to extract the second semantic segmentation data and/or motion data on the basis of the first semantic segmentation data captured at a plurality of different time instances. The motion data can represent the direction and/or the velocity of at least some of the spatial locations which are represented by respective elements forming the image data. In other words, the motion data can be given per data point, e.g., per pixel or per group of pixels corresponding to a channel. The first semantic segmentation data can comprise a plurality of pixels, i.e. the first semantic segmentation data can have the form of an image.

The third module is preferably configured to perform a fusion of temporal information in the sequence. This is because the input of the third module is semantic segmentation data from different time instances, i.e. the third module considers different "views" on the input data over time, which may be regarded as an abstract video.

The third module is preferably formed by a recurrent neural network (RNN). This RNN can have a specific structure, as will be addressed further below.

According to another embodiment a fourth module of the CNN is configured to extract object data from the second semantic segmentation data and the motion data, wherein the object data represents a spatial occupancy of objects in the scene.

For a given object in the scene, the object data can comprise a bounding box around the object, which is a form of object detection. A bounding box is preferably a rectangle around an object and adapted to the size of the object. This a simple way to represent the object and it makes subsequent processing of the object data more reliable. The object data can comprise further information to classify or characterise objects, for example object type, speed over ground, direction, size, height. With this information, an object can be easily tracked by a standard tracking algorithm, e.g., Kalman filtering.

The fourth module is preferably formed by a region-proposal network, which is described in detail in: Ren, Shaoqing and He, Kaiming and Girshick, Ross and Sun, Jian, Faster R-CNN: "Towards Real-Time Object Detection with Region Proposal Networks", Advances in Neural Information Processing Systems 28, 91-99, 2015.

A fifth module of the CNN can be configured to extract free-space data from the second semantic segmentation data and the motion data, wherein the free-space data represents the spatial occupancy of free space in the scene. The free-space data comprises a classification with regard to at least two class labels, e.g., free space and unknown space.

The fifth module is preferably implemented as a fully convolutional network, preferably a network as described in detail in: Jonathan Long, Evan Shelhamer, Trevor Darrell, "Fully Convolutional Models for Semantic Segmentation", CVPR, 2015.

The dynamic information extracted by the CNN preferably comprises the object data, the free-space data into and/or the motion data. The dynamic information can be outputted in a combined representation. In general, the dynamic information represents the dynamic, i.e. temporal changes in the scene. These changes can be encoded in the object data or the free-space marking but can also be explicitly given by motion data. For example, for each detected object, a velocity vector with a direction value (i.e., coordinates) and magnitude value can be determined. This corresponds to a specific form of motion data per object that can therefore be part of the object data. In contrast, the motion data extracted in the third module can represent any motion changes in the scene, e.g., per pixel.

The invention further relates to a system for processing data sequences. The system comprises at least one sensor for capturing a data sequence and a device according to one of the embodiments described herein. The sensor can comprise at least one of a radar sensor, a light detection and ranging sensor, an ultrasonic sensor or a camera. The sequence which is received by the device preferably represents data acquired by means of the sensor.

Another example described herein is a method of extracting dynamic information on a scene. The method includes acquiring a sequence of data blocks using at least one sensor, each of said data blocks comprising a multi-dimensional representation of a scene, extracting dynamic information on the scene by using a convolutional neural network, wherein the convolutional neural network is configured to receive the data blocks as input and to output the dynamic information in response, wherein the convolutional neural network comprises a plurality of modules, and wherein each of said modules is configured to carry out a specific processing task for extracting the dynamic information.

Having regard to a preferred application the invention also relates to a vehicle with a system as described herein, wherein a control unit of the vehicle is configured to receive dynamic information on the surrounding of the vehicle extracted by means of the device of the system. The control unit of the vehicle is further configured to control the vehicle with respect to the extracted information and/or to output a warning signal if the information meets a predetermined condition. The dynamic information may represent the position as well as the movement of objects in the surrounding of the vehicle.

In a more specific variant, the device can be configured to extract dynamic information on the surrounding of a vehicle comprising a convolutional neural network, wherein the device is configured to directly receive raw sensor data. This raw sensor data comprises a sequence of data blocks acquired over time using at least one sensor mounted on a vehicle, each of said data blocks comprising a plurality of data points, and each of said data points representing a spatial location in the surrounding of the vehicle. The convolutional neural network is configured to receive the data blocks as input and to output the dynamic information in response, wherein the convolutional neural network comprises a plurality of modules, and wherein each of said modules is configured to carry out a specific processing task for extracting the dynamic information.

Having regard to the third module, this module can have a specific structure, which is described further in the following.

The third module can be configured to receive an input sequence comprising a plurality of data items captured over time, each of said data items comprising a multi-dimensional representation of a scene, i.e. in form a semantic segmentation data. In other words, each data item corresponds to one time instant in which the scene has been captured in two, three or more dimensions. The sequence of data items can be interpreted as a complex video, wherein the frames of the video correspond to data items representing a scene at a particular time instant. Preferably, each data item of the input sequence is formed by first segmentation data from one time instant.

The third module can be further configured to generate an output sequence representing the input sequence processed item-wise by the convolutional neural network, i.e., the input sequence is processed sequentially, preferably in the order of the input sequence. Also preferably, the output sequence comprises a plurality of data items, each data item corresponding to a processed version of the respective data item of the input sequence.

The third module can comprise a sampling unit configured to generate an intermediate output sequence by sampling from a past portion of the output sequence according to a sampling grid. The past portion of the output sequence may consist of the very last data item of the output sequence but may also include data items further down from the history of the output sequence. By reusing a past portion in the third module for processing a current data item of the input sequence a form of recursive processing is implemented by the third module. The intermediate output sequence is a modified version of the past portion of the output sequence, wherein the modification is carried out item-wise by a sampling of the data item. This sampling is useful for taking account of dynamic changes in the data, which may be regarded as an adaption of the data for improving the processing of the input sequence. This will be explained further below.

The third module can be further configured to generate the sampling grid item-wise on the basis of a grid-generation sequence, wherein the grid-generation sequence is based on a combination of the input sequence and an intermediate grid-generation sequence. The intermediate grid-generation sequence represents a past portion of the output sequence or a past portion of the grid-generation sequence. The grid-generation sequence therefore comprises information of the current input sequence and the "processing history". This history may be provided either in the form of the past portion of the output sequence (e.g., the last data item of the output sequence) or the past portion of the grid-generation sequence (e.g., the last data item of the grid-generation sequence) which again represents a form of recursive processing.

The third module can be further configured to generate the output sequence based on a weighted combination of the intermediate output sequence and the input sequence. The combination can be interpreted as a controlled prediction of the output sequence, wherein for example either more or less of the input sequence is allowed to pass the third module. Due to the recursive processing, the intermediate output sequence also represents information about the previous behaviour of the input sequence and the output sequence. Therefore, time-dependencies are explicitly analysed by the third module and directly influence the processing of the input sequence viz. generation of the output sequence. This enables the third module to achieve a better robustness in accurately considering, i.e. recognizing temporal information present in the input data sequence. This means that information, which is also encoded through time dependencies, can be extracted with increased accuracy, for example motion data of objects and object-detection data. Furthermore, the analysis of the data is improved with respect to objects which suddenly appear and disappear due to occlusions (e.g., object birth and object death).

It is noted that, the weighted combination is not limited to a direct weighting of the mentioned sequences. As the case may be, any of the sequences can be processed prior to weighting. For example, the input sequence can be processed by an inner CNN which results in an intermediate input sequence which represents the (raw) input sequence.

The third module can be implemented as so-called deep neural network. In particular, the third module can comprise a plurality of inner CNNs. These inner CNNs are regarded as sub-networks, i.e. layers, of the third module. These inner CNNs can have the same, similar, or different structures but they all comprise a convolution of the input data with a convolutional kernel. In addition, it can be that the convolution result is added to a constant and that an activation function is applied, which can be a function configured to perform a transformation to a predefined scale, for example a scale of [0, 1], i.e. the output data is between zero and one. Examples for activation functions are the sigmoid function and the tanh function. Another example is a two-sided threshold function.

In general, each of the sequences addressed in connection with the third module comprise a plurality of data items, each data item comprising a plurality of data points. In this way, any processing of a data item can involve a processing of the data points. The data items can be processed one by one. Alternatively, data items may be processed in parallel or in combinations of data items.

According to a preferred variant of the third module, the grid-generation sequence is based on an item-wise combination of the input sequence and the intermediate grid-generation sequence. For example, the third module can be configured to form the grid-generation sequence by an item-wise combination of the input sequence and the intermediate grid-generation sequence. The combination can be a concatenation of the two involved sequences per item, wherein the concatenation can be adapted such that a subsequent processing of the concatenated data item allows for a separate processing of the two items forming the concatenation. As an alternative to a concatenation, the two sequences can be combined by a dedicated neural network, preferably also a CNN. In a specific case, this CNN can be a convolutional gated recurrent unit (GRU), which is a type of RNN described in: Tokmakov, P., Alahari, K. and Schmid, C., 2017, Learning Video Object Segmentation with Visual Memory. *arXiv preprint arXiv:*1704.05737. In another specific case, the CNN for combining the two sequencecs can be a convolutional LSTM. Preferably, this convolutional LSTM is implemented as described in: Xingjian, S. H. I., Chen, Z., Wang, H., Yeung, D. Y., Wong, W. K. and Woo, W. C., 2015: "Convolutional LSTM network: A machine learning approach for precipitation nowcasting". *Advances in neural information processing systems* (pp. 802-810).

The intermediate grid-generation sequence can be formed by the past portion of the output sequence, in particular wherein the past portion of the output sequence is processed with an inner CNN. Alternatively, the intermediate grid-generation sequence can be formed by the past portion of the grid-generation sequence processed with an inner CNN.

The sampling grid is preferably generated by processing the grid-generation sequence with at least one inner CNN. This is preferably carried out item-wise, i.e., one sampling grid is generated from one data item of the grid-generation sequence. Therefore, a sequence of sampling grids can be formed. However, there is preferably only one sampling grid per time step. In other words, in the third module there is no grid sequence but only one grid per time.

The third module can be configured to generate the output sequence by carrying out the following steps. As a first step a first weighting sequence and a second weighting sequence are generated based on one of the input sequence, the intermediate output sequence, the intermediate grid-generation sequence, the grid-generation sequence processed by an inner convolutional network, or a combination thereof. Both weighting sequences can be generated on the same basis or differently. For example, each weighting sequence can be generated on different combinations of the above sequences.

As a next step an intermediate input sequence is generated by processing the input sequence with an inner CNN. Then, the intermediate output sequence is weighted with the first weighting sequence and the intermediate input sequence is weighted with the second weighting sequence. These two weighted sequences are then superimposed, e.g. by simply adding the sequences, preferably item-wise. The weighting can be a multiplication, in particular a point-wise multiplication, which is also known as the Hadamard product. In the latter case, each involved sequence is composed of data items which comprise a plurality of data points, in particular pixels.

Generating the first weighting sequence and/or the second weighting sequence can include forming a combination, e.g. a concatenation, of at least two of the input sequence, the intermediate output sequence, the intermediate grid-generation sequence, the grid-generation sequence processed by an inner convolutional network, and forming a processed combination by processing the combination with an inner convolutional neural network. This inner CNN is preferably configured to process with a convolutional kernel and an activation function, in particular sigmoid function.

In a further variant one of the first weighting sequence or the second weighting sequence is formed by the processed combination and wherein the other of the first weighting sequence or the second weighting sequence is formed by the processed combination subtracted from a constant.

In general, the third module can be configured to generate the first and second weighting sequences correspondingly. However, it is understood that the processing parameters for each weighting sequence can be different, in particular any convolutional kernels used for processing the sequences.

Having regard to the sampling unit, the sampling grid preferably comprises a plurality of sampling locations, each of the sampling locations being defined by a respective pair of an offset and one of a plurality of data points of an item of the intermediate output sequence. So an offset represents a location shift of a data point which is underlying the offset. Therefore, the sampling grid defines where the past portion of the output sequence is to be sampled relative to the regular data points of the intermediate output sequence. This can be regarded as a specific form of processing which is controlled through the generated sampling grid. Preferably, the grid is adapted to predict motion in the data. Therefore, the data represented by a given data item can be optimized in view of the temporal changes in the previous data items. The motion data can be represented by the offsets, which can be regarded as vectors pointing to the desired sampling location. The sampling unit can be configured to perform an interpolation of data points. Therefore, if a sampling location is between given data points of the data item to be sampled, the sampled data point can simply be interpolated from one or more neighbouring data points, e.g., by bi-linear interpolation.

The motion data of the scene can be formed by a plurality of offsets of one or more sampling grids generated in the third module.

Each data item of the input sequence can comprise a plurality of data points, each data point representing a location in the scene and comprising a plurality of parameters, in particular coordinates, of the location. In particular, the data points of each data item of the input sequence can be formed by an image comprising a plurality of pixels. This is to say that the data points can be formed by pixels in which each data item represents the scene preferably in two or three dimensions. In general, each of the sequences described in connection with the third module can be formed of data items corresponding to the data items of the input sequence with regard to their structure.

As is known to those skilled in the art, a CNN is configured for processing by a training of the CNN. During training of a CNN, there are usually two steps, feed-forward and back-propagation. In feed-forward, the network receives input data and calculates the output data using initial processing parameters (i.e. filter weights and constants). Then, given the correct output data, the parameters are updated during back-propagation, wherein the gradient from a loss function is calculated (gradient descent).

Having regard to the modular structure of the global CNN, the modules can be trained individually first (pre-training). Afterwards, the global CNN can be trained. This training procedure has shown to further improve the accuracy of the extracted information.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention is described further by way of example with reference to the drawing in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
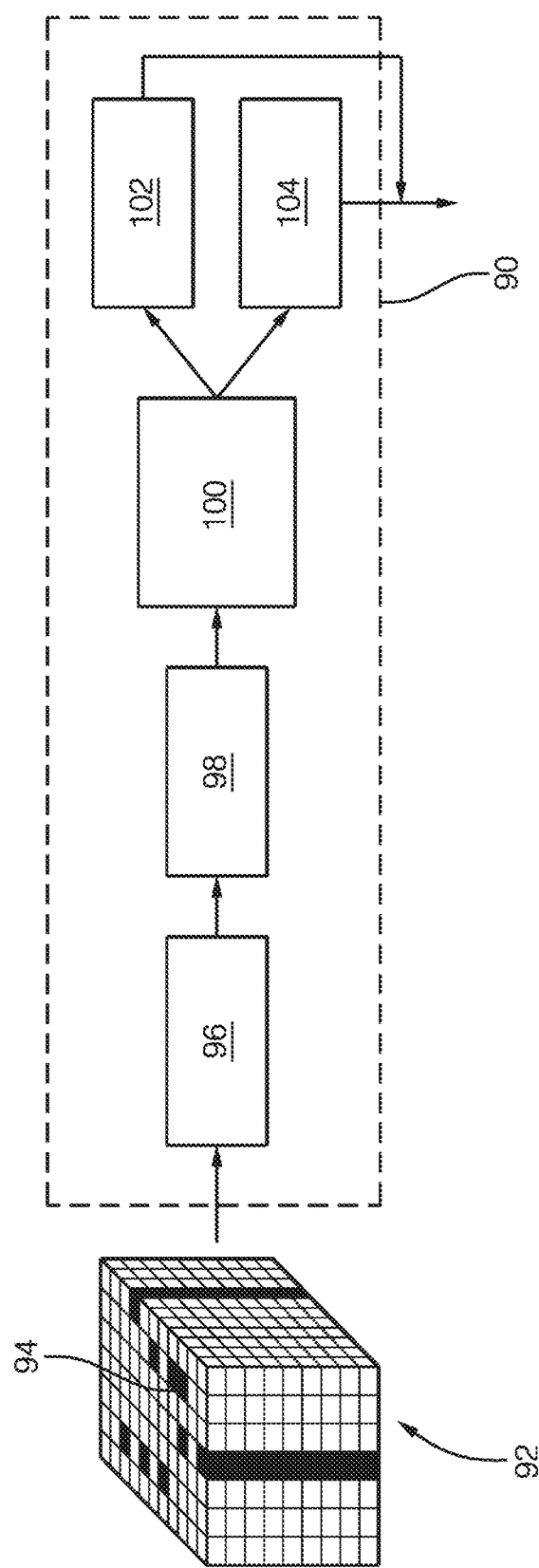
FIG. 1 shows a block diagram of a CNN in a device according to the invention.

A convolution neural network 90, hear after often referred to as the CNN 90, receives a data block 92 as input (cf. FIG. 1). The data block 92 comprises a plurality of data points 94, each data point 94 representing a location by three parameters. For example, the data block 92 can be raw sensor data of a radar sensor. In this case, each data point 94 can be described in polar coordinates (range, angle) and by the range rate, which sums up to three dimensions. The data block 92 can have a three-dimensional arrangement of data points 94, as shown in FIG. 1. However, other arrangements and more than three dimensions are possible. It is understood that the CNN 90 receives data blocks 92 in a sequential manner.

Figure 2:
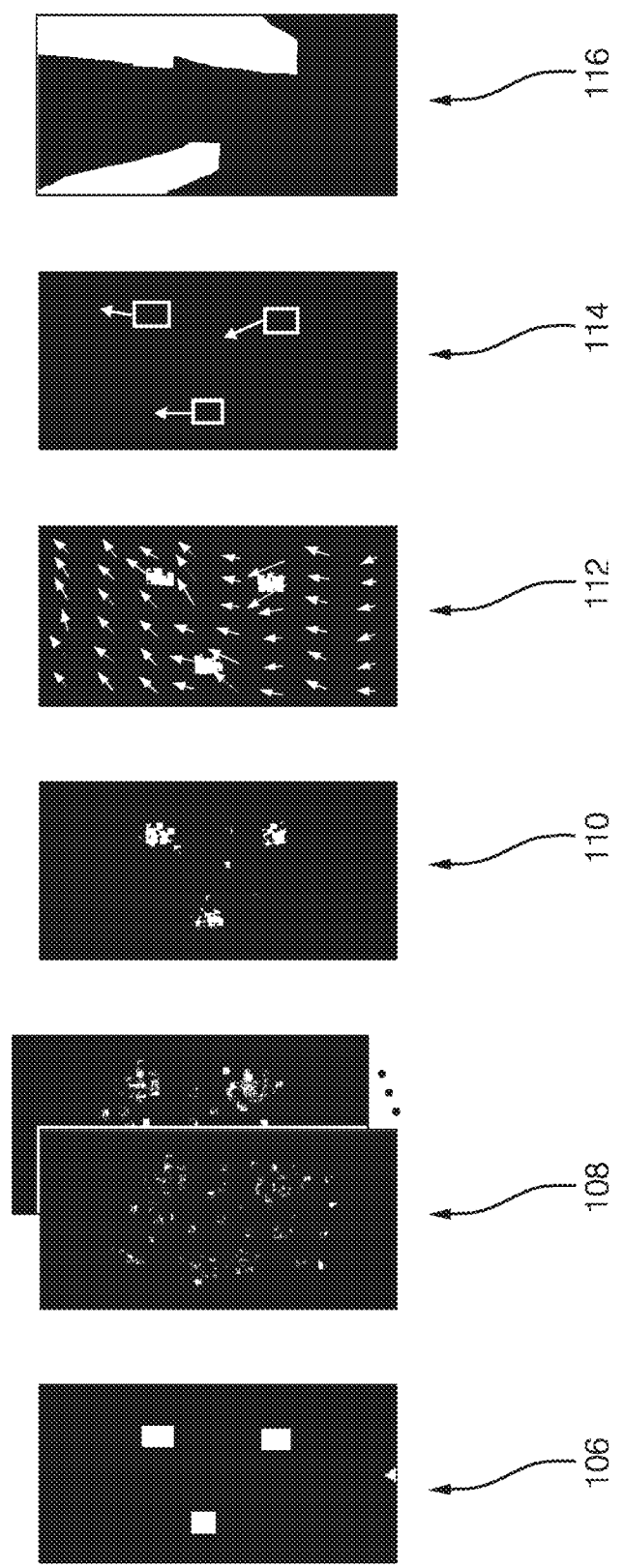
FIG. 2 illustrates data generated during extraction of dynamic information.
Figure 3:
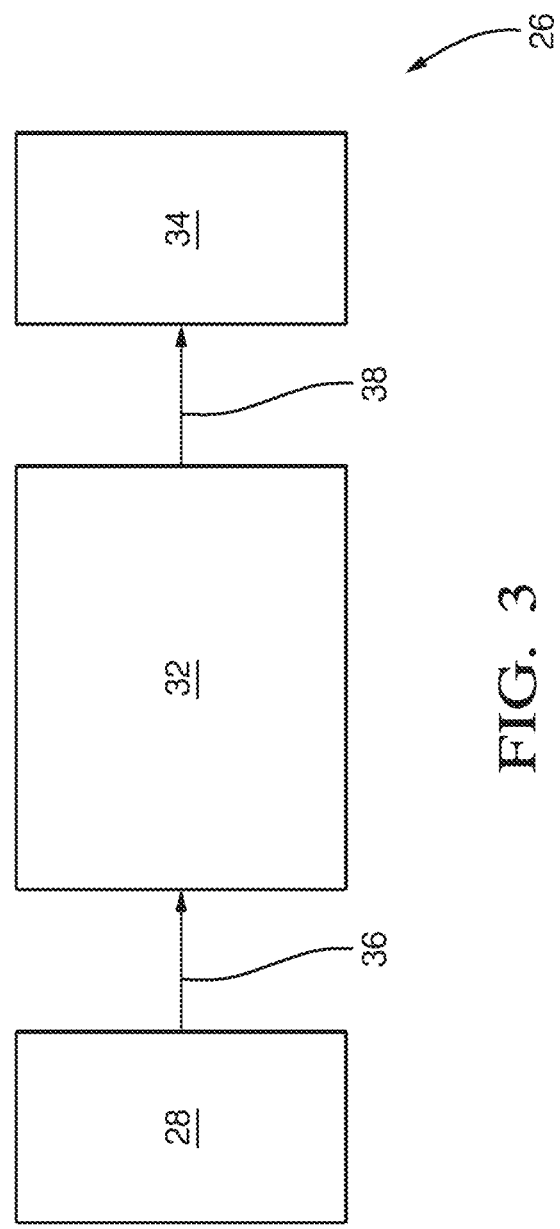
FIG. 3 shows a system with a device comprising a CNN as illustrated in FIG. 1.

The data block 92 is a physical representation of a scene which is shown as an example image 106 in FIG. 2 comprising three objects indicated as white rectangles. This effectively is the "ground truth".

The CNN 90 has a total of five modules, each of the modules formed by a sub-network of the CNN 90. The first module 96 is a neural network configured to generate image data from the data block 92. In FIG. 2, an example 108 is given for the image data comprising 2 channels. As can be seen, the example 108 is a noisy representation of the ground truth image 106.

The image data 108 is then received by a second module 98 configured to provide a first semantic segmentation and motion information of the image data 108. The first semantic segmentation is illustrated by an image 110 in FIG. 2.

The first segmentation is then processed by a third module 100 configured to provide a second semantic segmentation and motion information of the image data, illustrated by an image 112 in FIG. 2. As can be seen from FIG. 2, the second segmentation better matches with the ground-truth image 106 with respect to the objects and therefore gives a more accurate result than the first semantic segmentation. A main reason for this is the explicit use of temporal information of the sequence in the third module 100. The motion information is shown in the image 112 in form of white arrows for some of the elements forming the image 112. These arrows represent offsets which are generated if the third module comprises a sampling unit as described further above.

On the basis of the second segmentation data and the motion information a fourth module 102 and a fifth module 102 provide object data (image 114) and a free-space marking of the scene (image 116), as illustrated in FIG. 2. The object data comprises a (white) bounding box for each object and a vector which indicates the direction and the velocity of the objects.

With reference to FIG. 2, a system 26 can comprise a sensor 28 for capturing (i.e. acquiring) an input sequence 36 for a device 32, wherein the input sequence 36 can represent a scene, for example a traffic scene. The sensor 28 can be a radar sensor mounted on a vehicle (not shown) which is configured for an autonomous driving application by the system 26.

The input sequence 36 is received by device 32 and processed by a CNN, for example the CNN shown in FIG. 1. This is to say that the device 32 has processing means which are configured to make use of a CNN as described herein. Output data 38 is outputted by the device 32 and can be inputted to a control unit 34 of a vehicle (not shown). The control unit 34 is configured to control the vehicle on the basis of the output data 38.

In the following different variants of the third module 100 are described.

Figure 4:
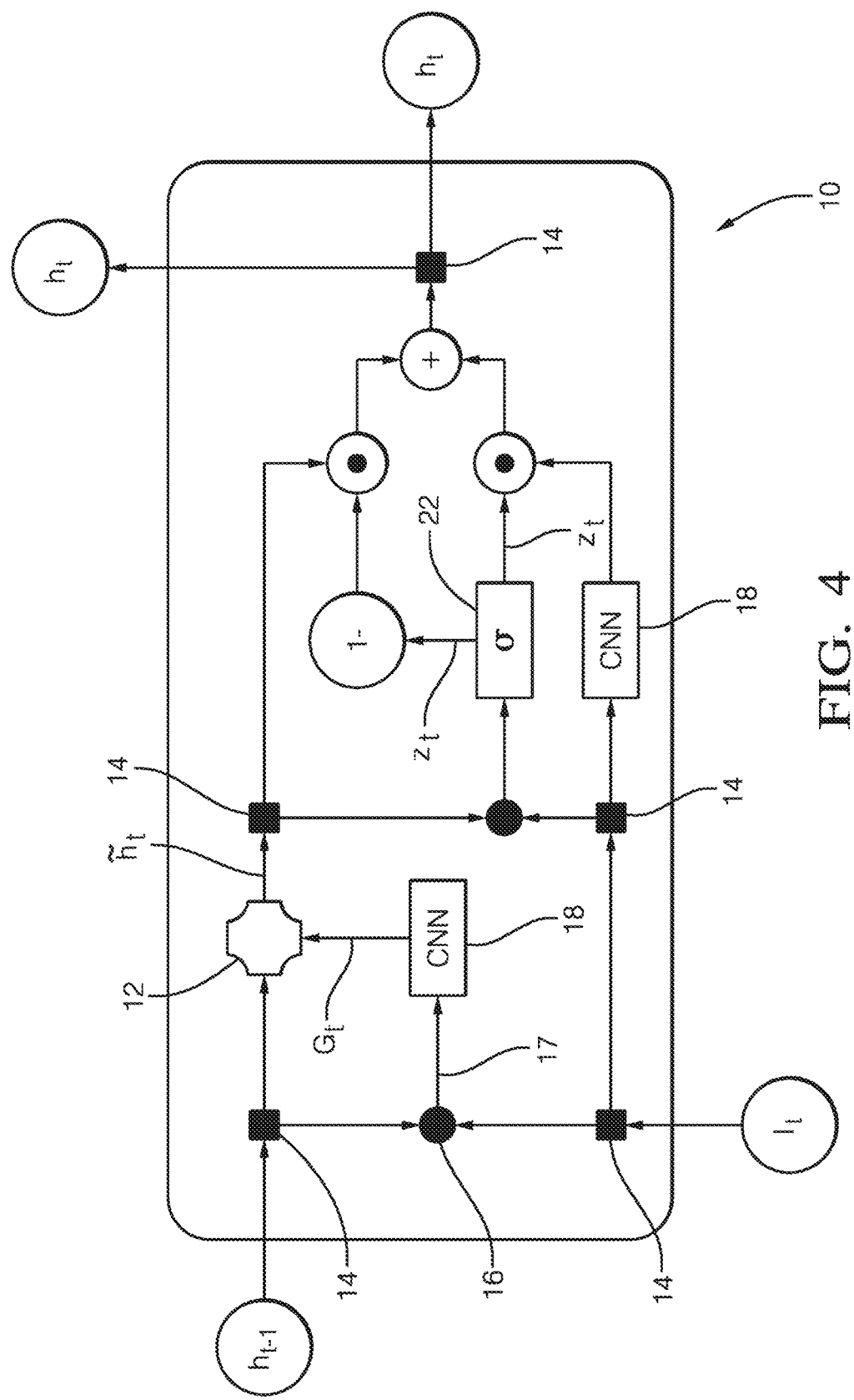
FIGS. 4 to 13 show variants of a third module for the CNN as illustrated in FIG. 1.

A first example of a third module 10 in shown in FIG. 4. The processing of an input sequence $I_t = \{ \ldots, I_{t-2}, I_{t-1}, I_t, I_{t+1}, \ldots \}$ with t being a sequence index and each element of the sequence being a data item can be described by the following set of equations:

$$G_t = \text{CNN}(I_t, h_{t-1})$$

$$\tilde{h}_t = \text{Sample}(h_{t-1}, G_t)$$

$$z_t = \sigma(W_{iz} * I_t + W_{hz} * \tilde{h}_t + b_z)$$

$$h_t = (1 - z_t) \odot \tilde{h}_t + z_t \odot \text{CNN}(I_t)$$

The variables $h_t$ and $\tilde{h}_t$ stand for an output sequence and an intermediate output sequence, respectively. The variable $z_t$ represents a weighting sequence. Each data item of the sequences comprises a plurality of data points, for example pixels of an image.

In the formulas, * denotes the convolutional operator and ⊙ denotes a point-wise multiplication (Hadamard product). W indicates a convolutional kernel, with the indices indicating the variables to which the kernel refers. "Sample" denotes sampling by means of a sampling unit 12, with the first argument being the input to the sampling unit 12 and the second argument being the sampling grid.

In FIG. 4, the solid black squares 14 generally denote a "duplication" of information, which means that the arrows leaving the squares 14 carry the same information as the input arrow. The solid black circles 16 generally denote a combination of information. For example the past portion of the output sequence, $h_{t-1}$, is concatenated with the input sequence $I_t$ to form an intermediate grid generation sequence at 17. This sequence is then processed by CNN 18, which is generally an inner CNN. The result is the sampling grid $G_t$ in the case of FIG. 1. CNN( ) is an operator in the equations, wherein the arguments of CNN( ) refer to a combination of the arguments, e.g., a concatenation.

Similarly, the intermediate output sequence $\tilde{h}_t$ is concatenated with the input sequence $I_t$ followed by processing with block 22 as defined in the equations above, wherein σ denotes the sigmoid function. Block 22 is a specific form of an inner CNN.

As can be seen from the above formulas for $h_t$, the input sequence is processed with another inner CNN 18. The result, i.e. CNN ($I_t$) is an intermediate input sequence.

The general convention as described in connection with FIG. 4 is the same in FIGS. 5 to 13.

Figure 5:
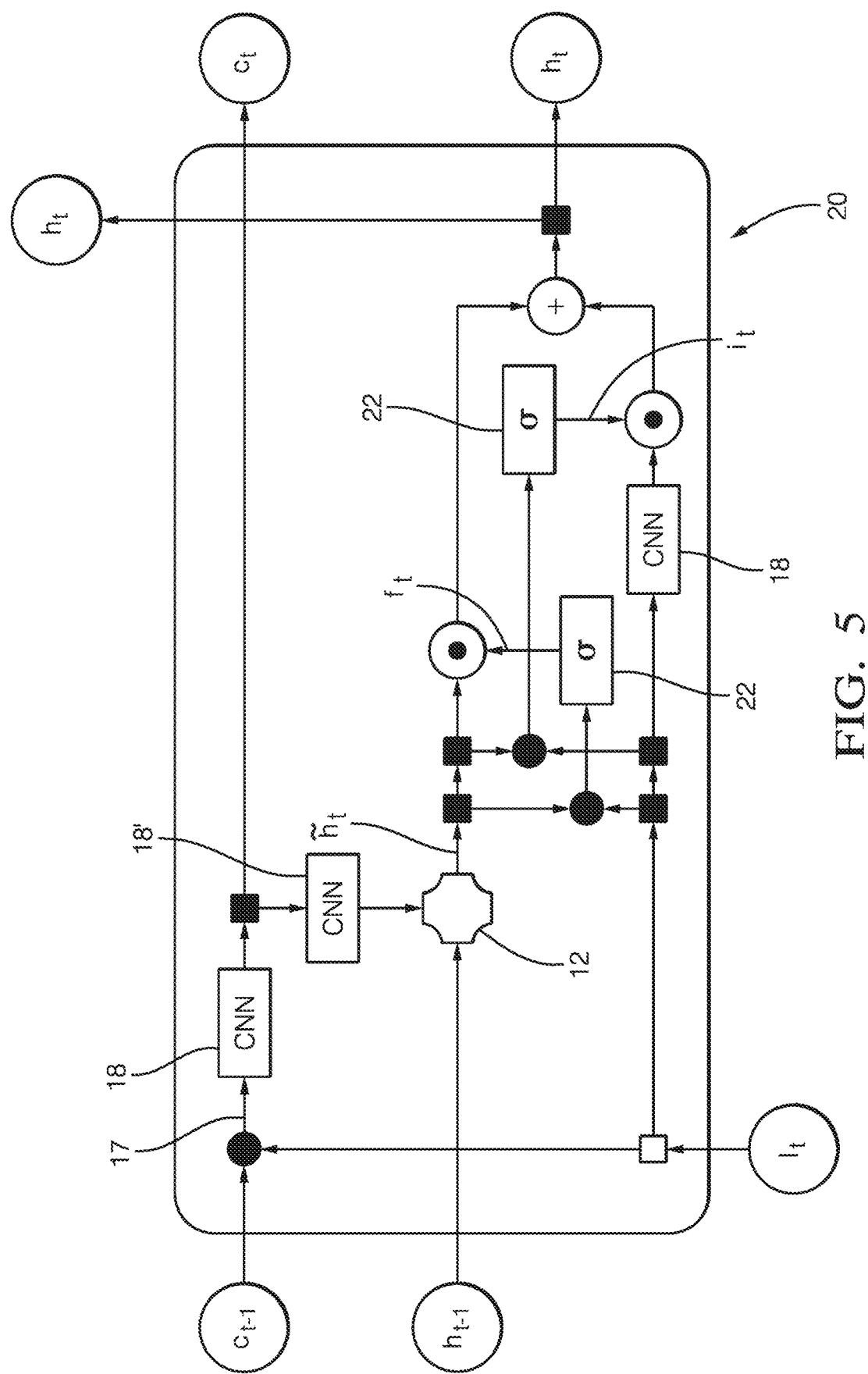

A second example, third module 20, is shown in FIG. 5 and is defined by the following set of equations:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{Ii} * I_t + W_{hi} * \tilde{h}_t + b_i)$$

$$f_t = \sigma(W_{If} * I_t + W_{hf} * \tilde{h}_t + b_f)$$

$$h_t = f_t \odot \tilde{h}_t + i_t \odot \text{CNN}(I_t)$$

In contrast to the first example, the grid-generation sequence is formed on the basis of a combination of the input sequence $I_t$ and an intermediate grid-generation sequence $C_{t-1}$. As can be seen from FIG. 5, the combination is processed by inner CNN 18 which gives $C_t$, a processed version of the grid-generation sequence, which recursively forms the intermediate grid-generation sequence of the next time step ($C_{t-1}$). The processed version of the grid-generation sequence is further processed by an inner CNN 18' to give the sampling grid $G_t$.

A further aspect of the third module 20 is that the first weighting sequence $f_t$ and the second weighting sequence $i_t$ are formed correspondingly by blocks 22, which have the same input, namely a combination of the intermediate output sequence and the input sequence.

Figure 6:
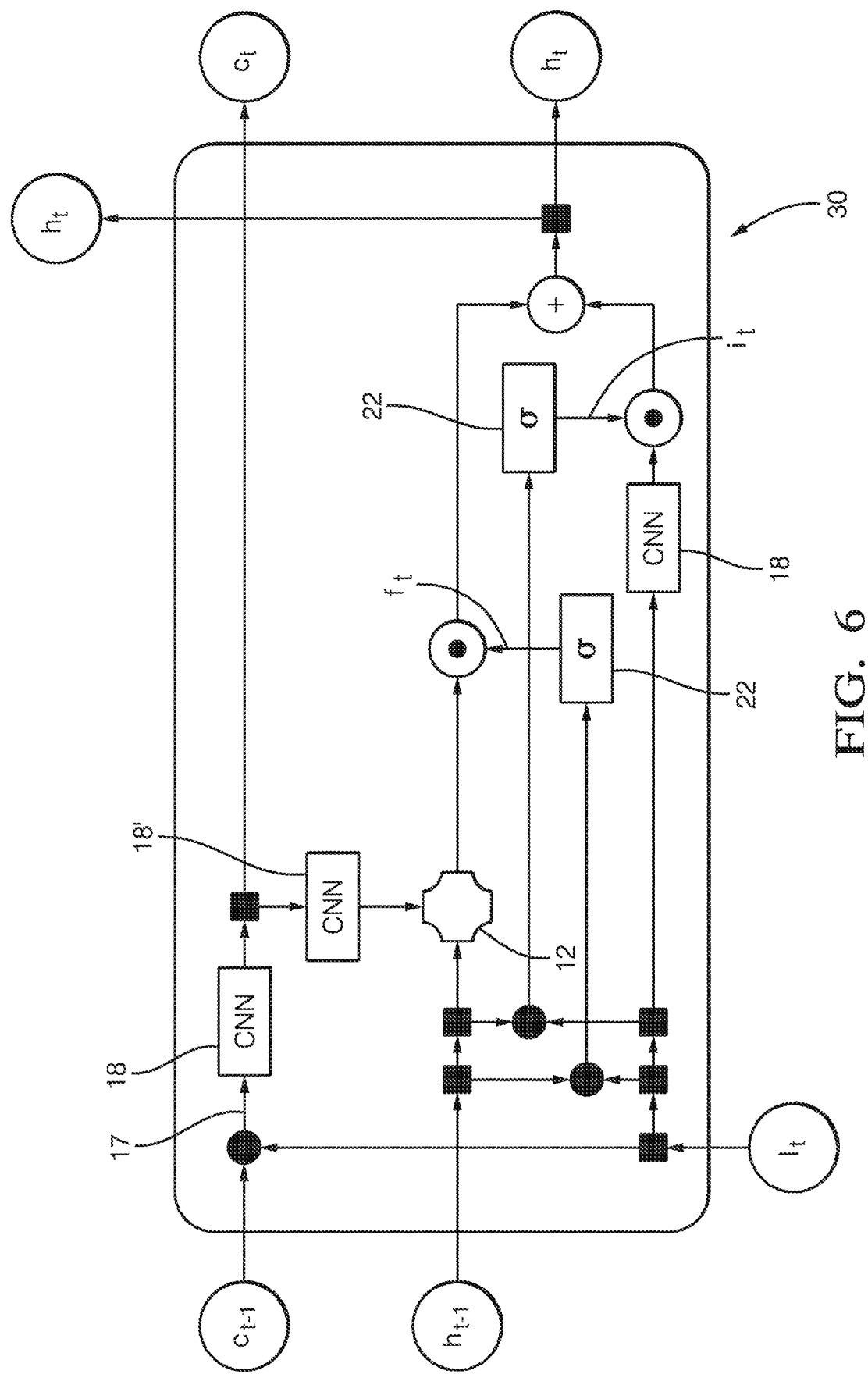

The third module 30 shown in FIG. 6 forms a third example described by:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{Ii} * I_t + W_{hi} * h_{t-1} + b_i)$$

$$f_t = \sigma(W_{If} * I_t + W_{hf} * h_{t-1} + b_f)$$

$$h_t = f_t \odot \tilde{h}_t + i_t \odot \text{CNN}(I_t)$$

The third module 30 deviates from the third module 20 in that the first and second weighting sequences $f_t$ and $i_t$ are based on a combination of the past portion of the output sequence $h_{t-1}$ and the input sequence.

Figure 7:
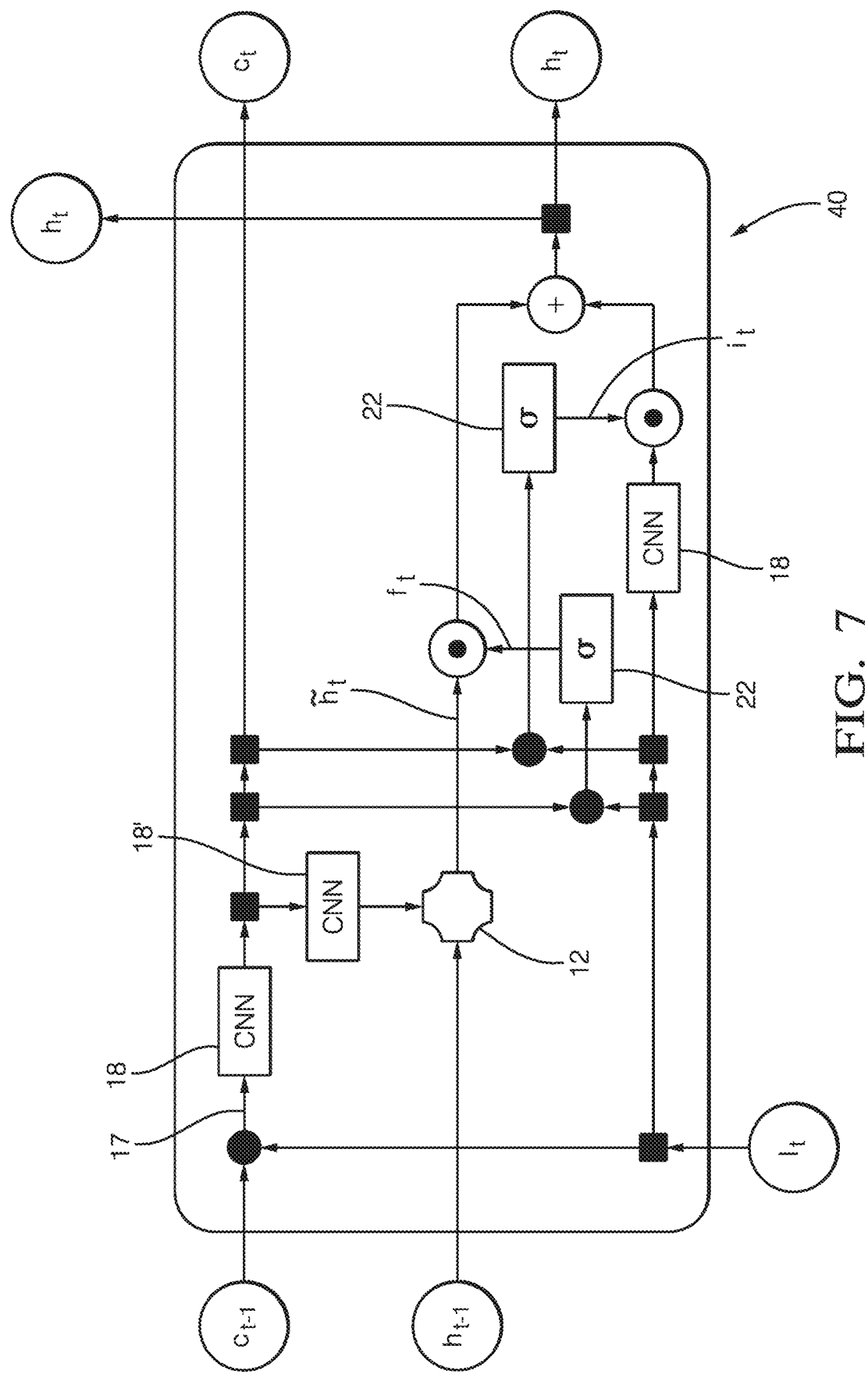

A fourth example is given by third module 40 in FIG. 7. It is described by the following set of equations:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{Ii} * I_t + W_{ci} * C_t + b_i)$$

$$f_t = \sigma(W_{If} * I_t + W_{cf} * C_t + b_f)$$

$$h_t = f_t \odot \tilde{h}_t + i_t \odot \text{CNN}(I_t)$$

The third module 40 deviates from the third modules 20 and 30 in that the first and second weighting sequences $f_t$ and $i_t$ are based on a combination of the grid-generation sequence processed by inner CNN 18 and the input sequence.

Figure 8:
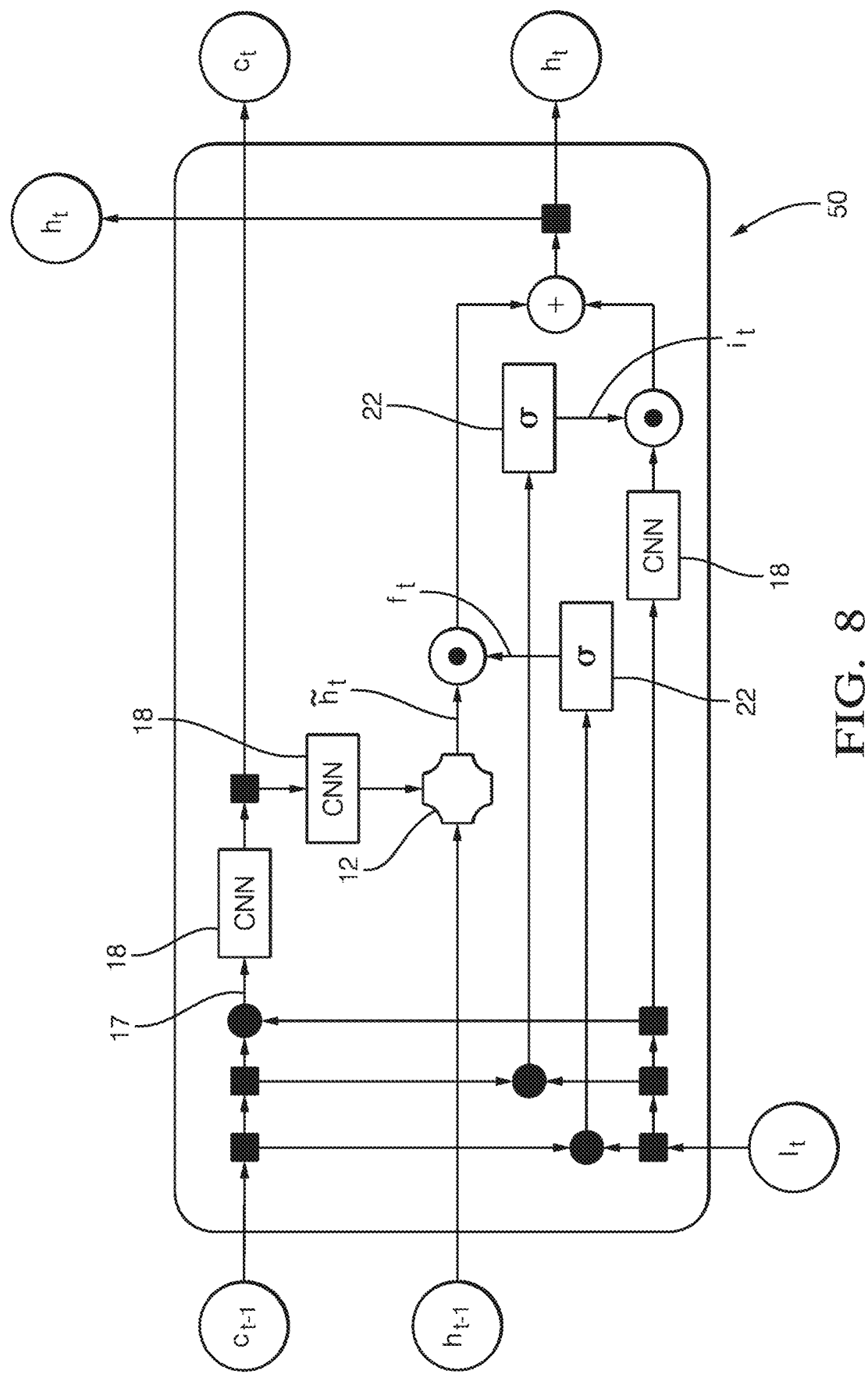

A fifth example is given by third module 50 shown in FIG. 8. The following set of equations applies:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{Ii} * I_t + W_{ci} * C_{t-1} + b_i)$$

$$f_t = \sigma(W_{If} * I_t + W_{cf} * C_{t-1} + b_f)$$

$$h_t = f_t \odot \tilde{h}_t + i_t \odot \text{CNN}(I_t)$$

As can be seen in FIG. 8 and in the equations, the first and second weighting sequences $f_t$ and $i_t$ are based on a combination of the intermediate grid-generation sequence $C_{t-1}$ and the input sequence $I_t$. In addition, the grid-generation sequence formed at 17 is formed by the same combination.

Figure 9:
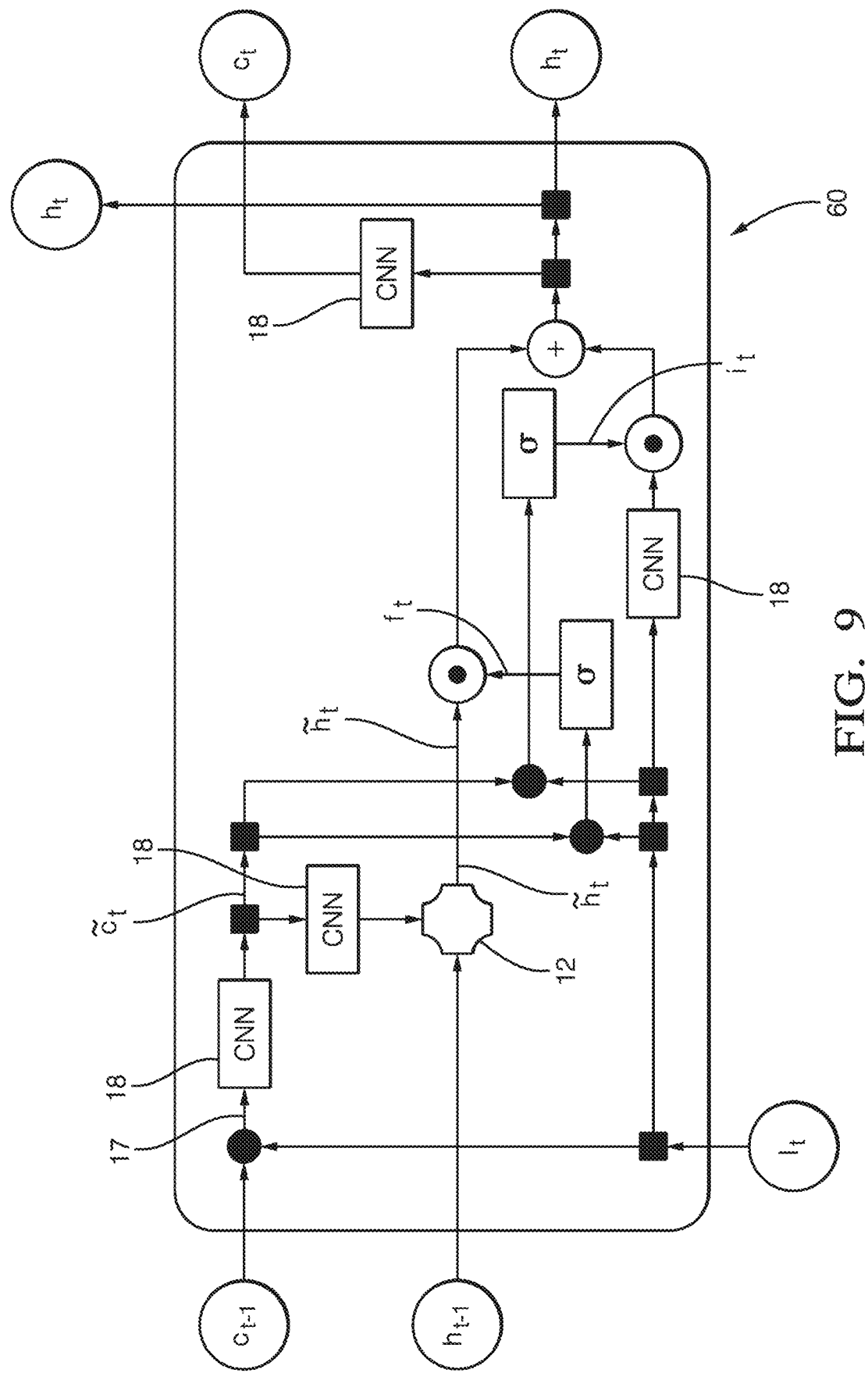

A sixth example is given by third module 60 shown in FIG. 9. The following set of equations applies:

$$\tilde{C}_t = \text{CNN}(I_t, C_{t-1})$$

$$G_t = \text{CNN}(\tilde{C}_t)$$

$$\tilde{h}_t = \text{Sample}(h_{t-1}, G_t)$$

$$i_t = \sigma(W_{Ii} * I_t + W_{ci} * C_{t-1} + b_i)$$

$$f_t = \sigma(W_{If} * I_t + W_{cf} * C_{t-1} + b_f)$$

$$h_t = f_t \odot \tilde{h}_t + i_t \odot \text{CNN}(I_t)$$

$$C_t = \text{CNN}(h_t)$$

As a major difference to the previous cases, the intermediate grid-generation sequence $C_{t-1}$ is formed by a past portion of the output sequence $h_t$ processed by an inner CNN 18 as shown at the right-end side of third module 60.

Figure 10:
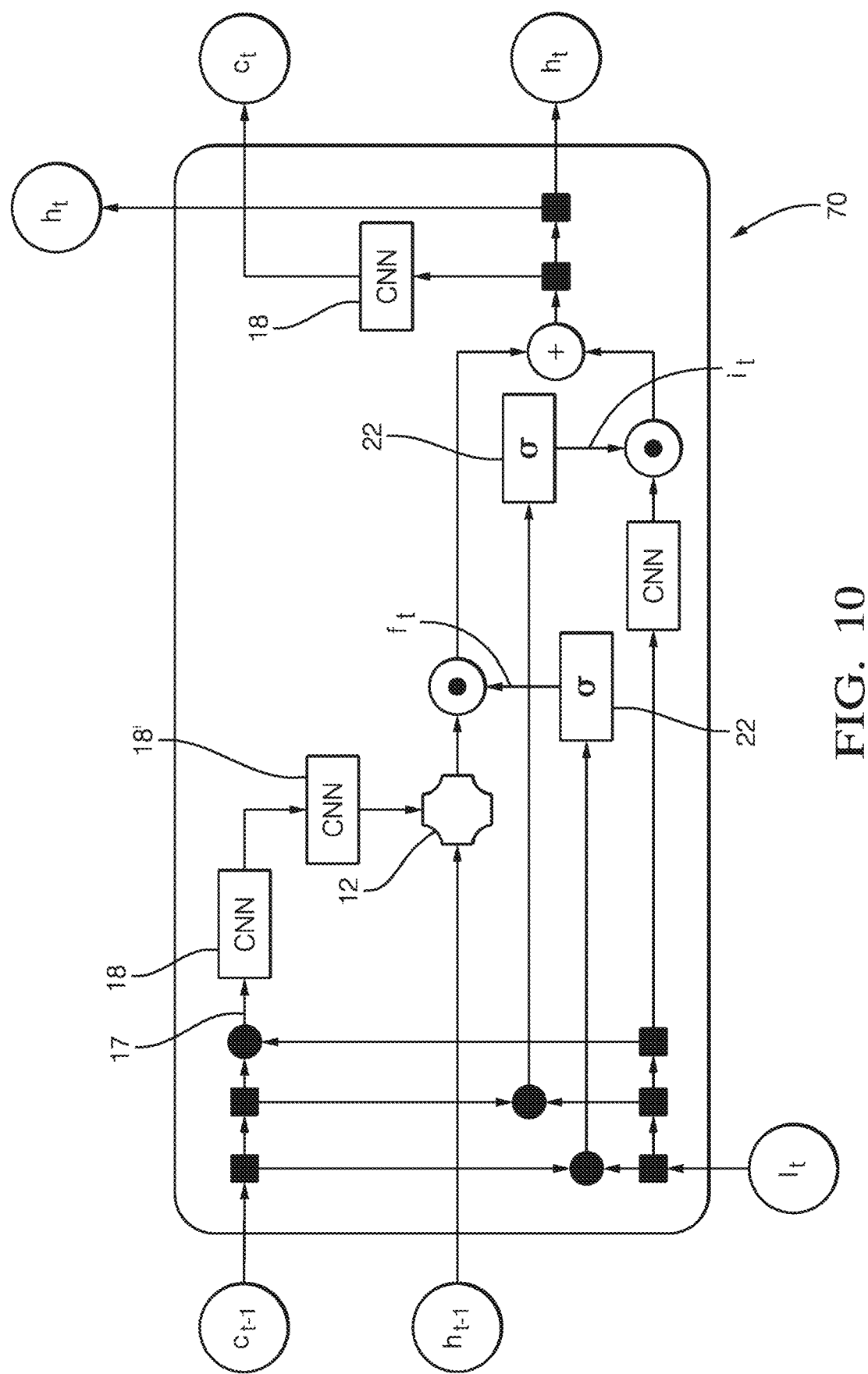

Third module 70 shown in FIG. 10 is described by the following equations:

$$\tilde{C}_t = \text{CNN}(I_t, C_{t-1})$$

$$G_t = \text{CNN}(\tilde{C}_t)$$

$$\tilde{h}_t = \text{Sample}(h_{t-1}, G_t)$$

$$i_t = \sigma(W_{Ii} * I_t + W_{ci} * C_{t-1} + b_i)$$

$$f_t = \sigma(W_{If} * I_t + W_{cf} * C_{t-1} + b_f)$$

$$h_t = f_t \odot \tilde{h}_t + i_t \odot \text{CNN}(I_t)$$

$$C_t = \text{CNN}(h_t)$$

The third module 70 corresponds to third module 60 but the first and second weighting sequences $f_t$ and $i_t$ are formed as in third module 50.

Figure 11:
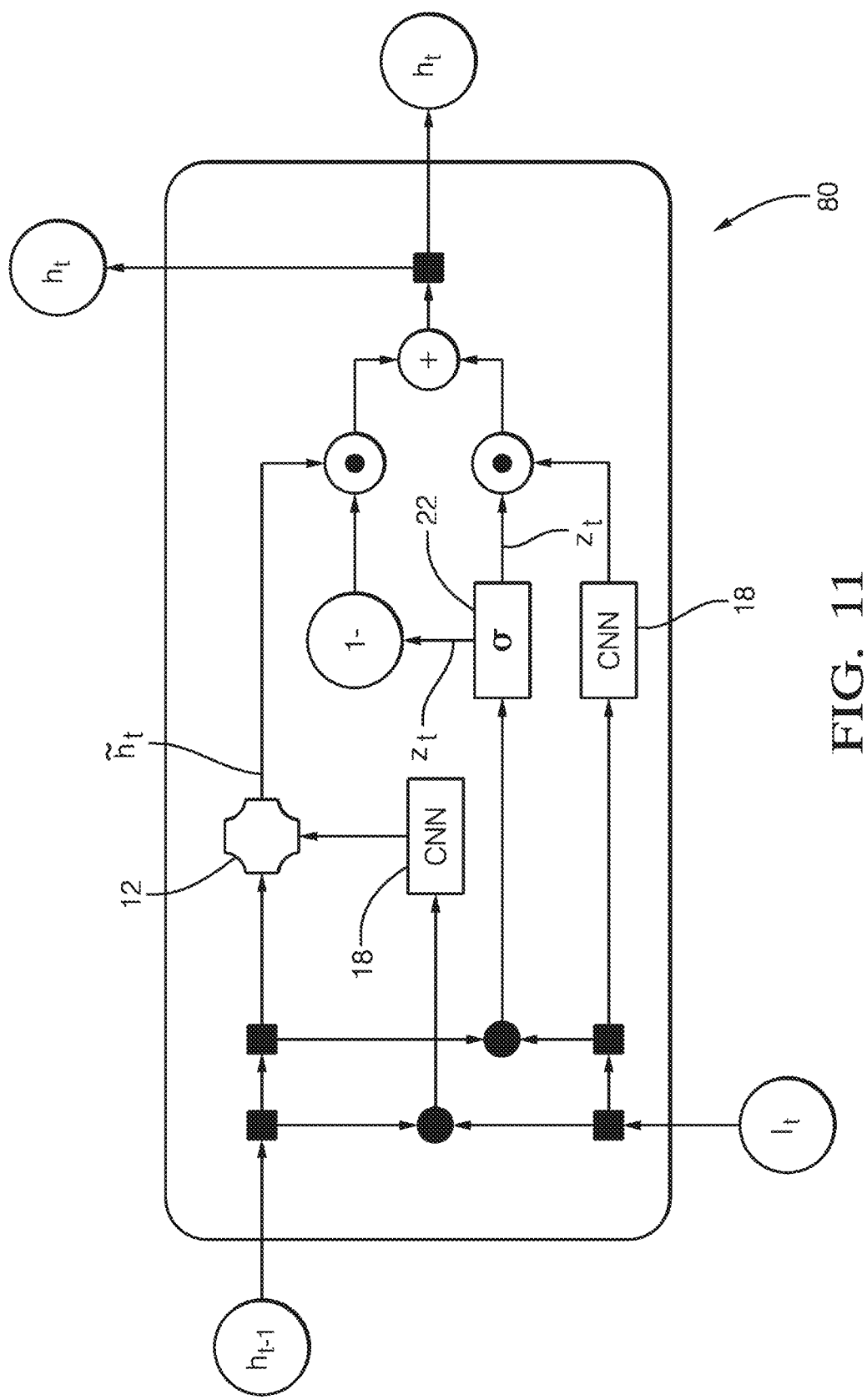

An eighth example is given by third module 80 shown in FIG. 11. The following set of equations applies:

$$G_t = \text{CNN}(I_t, h_{t-1})$$

$$\tilde{h}_t = \text{Sample}(h_{t-1}, G_t)$$

$$z_t = \sigma(W_{Iz} * I_t + W_{hz} * h_{t-1} + b_z)$$

$$h_t = (1 - z_t) \odot \tilde{h}_t + z_t \odot \text{CNN}(I_t)$$

The eighth example corresponds to third module 10 from FIG. 4 with the difference that the weighting sequence $z_t$ is based on a combination of the input sequence and the past portion of the output sequence.

Figure 12:
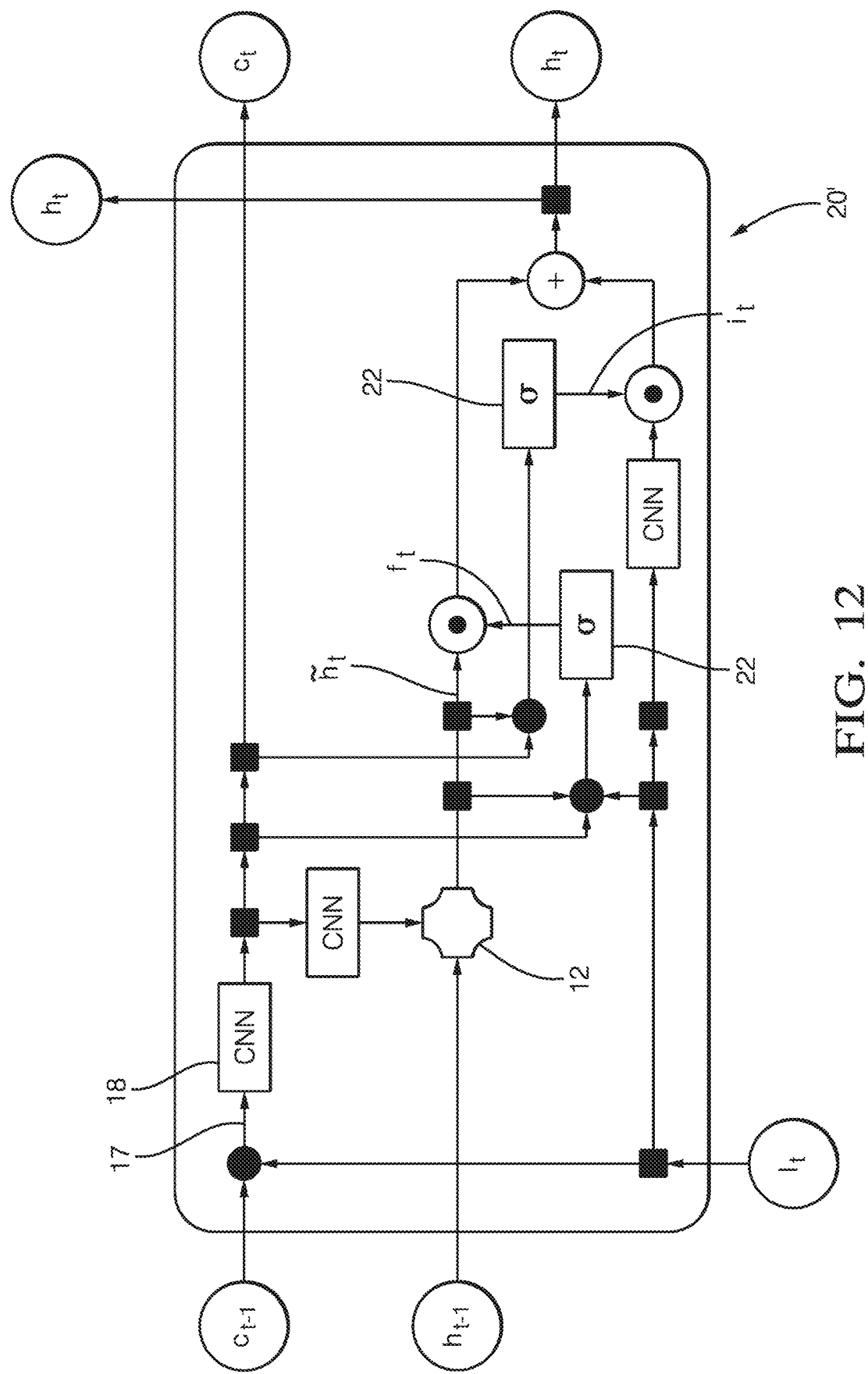

A ninth example, a variant of third module 20 is given by third module 20' shown in FIG. 12. The following set of equations applies:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{ci} * C_t + W_{hi} * \tilde{h}_t + b_i)$$

$$f_t = \sigma(W_{If} * I_t + W_{hf} * \tilde{h}_t + W_{cf} * C_t + b_f)$$

$$h_t = f_t \odot \tilde{h}_t + i_t \odot \text{CNN}(I_t)$$

In third module 20', the first and second weighting sequences are not formed correspondingly with respect to the input of blocks 22. As can be seen from FIG. 9 and the equations, for the first weighting sequence the intermediate output sequence $\tilde{h}_t$ is combined with the grid-generation sequence formed at 17 processed with an inner CNN 18, which is $C_t$ forming the intermediate grid-generation sequence, i.e. data item $C_{t-1}$, for the next time step. In contrast the second weighting sequence is based on a combination of three sequences, as defined in the formula above for $f_t$ and FIG. 9. From this example it becomes apparent that the input to the blocks 22 do not need to be the same.

Figure 13:
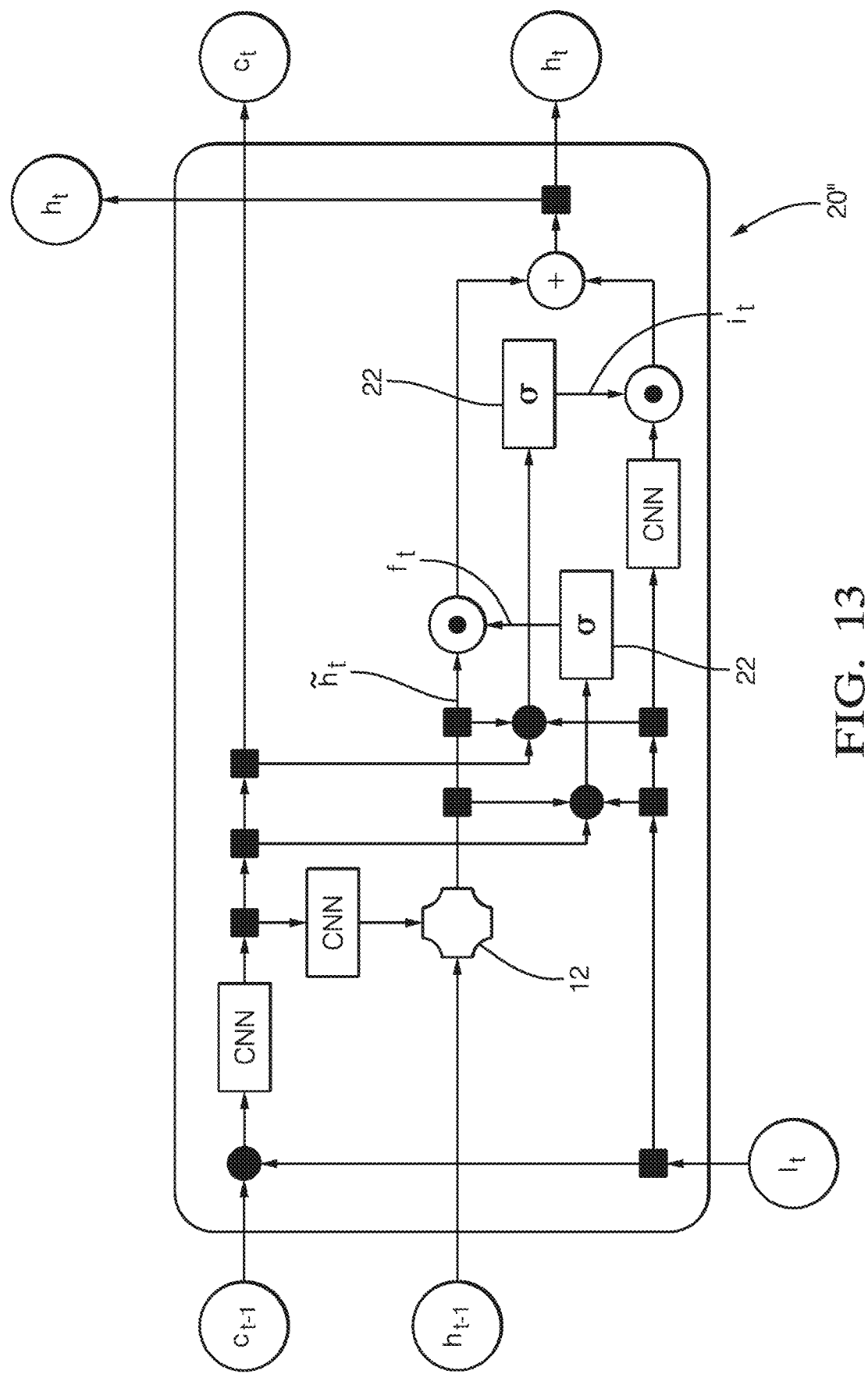

A tenth example is given by third module 20" shown in FIG. 13. The following set of equations applies:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{Ii} * I_t + W_{hi} * \tilde{h}_t + W_{ci} * C_t + b_i)$$

$$f_t = \sigma(W_{If} * I_t + W_{hf} * \tilde{h}_t + W_{cf} * C_t + b_f)$$

$$h_t = f_t \odot \tilde{h}_t + i_t \odot \text{CNN}(I_t)$$

Third module 20" corresponds to third module 20' with the difference that the input to blocks 22 can involve the same combination of sequences. Other combinations are possible, also combinations with more than three sequences.

While this invention has been described in terms of the preferred embodiments thereof, it is not intended to be so limited, but rather only to the extent set forth in the claims that follow.

We claim:

1. A device for extracting dynamic information comprising:
    at least one processor configured to train a global convolutional neural network including multiple convolutional neural sub-networks, the processor further configured to execute the global convolutional neural network to:
receive, as input, a sequence of data blocks acquired over time from at least one sensor that comprises a radar sensor, each of said data blocks comprising a multi-dimensional representation of a scene; and
responsive to the input, output dynamic information on the scene,
wherein the global convolutional neural network comprises a plurality of modules representative of the multiple neural sub-networks including at least a first module, a second module, and a third module, each of the plurality of modules being individually trained to carry out a specific processing task for extracting the dynamic information from the sequence of data blocks received as the input,
wherein the first module is a data reduction module configured to extract, from a data block of the sequence, the sensor data of the scene being formed by a multi-dimensional grid of elements, each of the multi-dimensional grid of elements comprising one or more channels including at least one radar channel comprising motion data representing a motion of objects captured in the sensor data,
wherein the second module is a classification module configured to extract, from the sensor data of the scene, first semantic segmentation data of the scene, the first semantic segmentation data comprising a classification of the sensor data for distinguishing between background and the objects captured in the sensor data, and
wherein the third module is a temporal fusion module configured to extract, from the first semantic segmentation data extracted from the sensor data at a plurality of different time instances, second semantic segmentation data of the scene and the motion data of the scene as the dynamic information on the scene that is output in response to the input.

2. The device according to claim 1, wherein:
the first module is formed by a fully-connected layer neural network;
the second module is formed by a U-net neural network; and
the third module is formed by a recurrent neural network.

3. The device according to claim 1, wherein the plurality of modules includes a fourth module configured to extract object data from the second semantic segmentation data and the motion data, wherein the object data represents a spatial occupancy of objects in the scene, wherein the object data additionally represents a velocity of objects in the scene.

4. The device according to claim 3, wherein for a given object in the scene, the object data comprises a bounding box around the object, and wherein the object data additionally comprises the velocity of the object.

5. The device according to claim 3, wherein the plurality of modules includes a fifth module configured to extract free-space data from the second semantic segmentation data and the motion data, wherein the free-space data represents a spatial occupancy of free space in the scene.

6. The device according to claim 5, wherein the dynamic information comprises the object data, the free-space data or the motion data.

7. The device according to claim 5, wherein the fifth module is formed by a fully convolutional network for semantic segmentation.

8. The device according to claim 3, wherein the fourth module is formed by a region-proposal network.

9. The device according to claim 1, wherein the third module includes at least one convolutional gated recurrent unit.

10. The device according to claim 1, wherein the third module includes at least one convolutional Long Short-Term Memory neural network.

11. A method, comprising:
training, by at least one processor of a system, a global convolutional neural network including a plurality of modules representative of multiple neural sub-networks including at least a first module trained as a data reduction module, a second module trained as a classification module, and a third module trained as a temporal fusion module, the training comprising individually training each of the plurality of modules to carry out a specific processing task for outputting dynamic information extracted from a sequence of data blocks received as an input each of the data blocks comprising a multi-dimensional representation of a scene; and
executing, by the at least one processor of the system, the global convolution neural network by at least:
receiving, as the input and over time from at least one sensor that comprises a radar sensor, the sequence of data blocks; and
responsive to receiving the input, outputting dynamic information on the scene that is extracted from the input, the dynamic information being extracted by at least:
extracting, by the first module, from a data block of the sequence, sensor data of the scene being formed by a multi-dimensional grid of elements, each of the multi-dimensional grid of elements comprising one or more channels including at least one radar channel comprising motion data representing a motion of objects captured in the sensor data;
extracting, by the second module, from the sensor data of the scene, first semantic segmentation data of the scene, the first semantic segmentation data comprising a classification of the sensor data for distinguishing between background and the objects captured in the sensor data; and
extracting, from the first semantic segmentation data extracted from the sensor data at a plurality of different time instances, second semantic segmentation data of the scene and the motion data of the scene as the dynamic information on the scene that is output in response to the input.

12. The method according to claim 11, wherein:
the first module is formed by a fully-connected layer neural network;
the second module is formed by a U-net neural network; and
the third module is formed by a recurrent neural network.

13. The method according to claim 11, including extracting, with a fourth module, object data from the second semantic segmentation data and the motion data, wherein the object data represents a spatial occupancy of objects in the scene, and wherein the object data additionally represents a velocity of objects in the scene.

14. The method according to claim 13, wherein for a given object in the scene, the object data comprises a bounding box around the object, and wherein the object data additionally comprises the velocity of the object.

15. The method according to claim 13, including extracting, with a fifth module, free-space data from the second semantic segmentation data and the motion data, wherein the free-space data represents a spatial occupancy of free space in the scene.

16. The method according to claim 15, wherein the dynamic information comprises the object data, the free-space data or the motion data.

17. A system comprising:
at least one sensor including a radar sensor; and
a device, the device comprising:
  at least one processor configured to train a global convolutional neural network including multiple convolutional neural sub-networks,
  the processor further configured to execute the global convolution neural network to:
    receive, as input, a sequence of data blocks acquired over time from at least one sensor that comprises a radar sensor, each of said data blocks comprising a multi-dimensional representation of a scene; and
    responsive to the input, output dynamic information on the scene;
  wherein the global convolutional neural network comprises a plurality of modules representative of the multiple neural sub-networks including at least a first module, a second module, and a third module, each of the plurality of modules being individually trained to carry out a specific processing task for extracting the dynamic information from the sequence of data blocks received as the input,
  wherein the first module is a data reduction module configured to extract, from a data block of the sequence, sensor data of the scene being formed by a multi-dimensional grid of elements, each of the multi-dimensional grid of elements comprising one or more channels including at least one radar channel comprising motion data representing a motion of objects captured in the sensor data,
  wherein the second module is a classification module configured to extract, from the sensor data of the scene, first semantic segmentation data of the scene, the first semantic segmentation data comprising a classification of the sensor data for distinguishing between background and the objects captured in the sensor data, and
  wherein the third module is a temporal fusion module configured to extract, from the first semantic segmentation data extracted from the sensor data at a plurality of different time instances, second semantic segmentation data of the scene and the motion data of the scene as the dynamic information on the scene that is output in response to the input.

18. The system according to claim 17, wherein the at least one sensor further comprises at least one of a light detection and ranging sensor, an ultrasonic sensor or a camera and wherein the data sequence represents data acquired by means of the sensor.

19. The system of claim 17, the system being part of a vehicle, wherein the vehicle comprises a control unit configured to:
receive dynamic information on a surrounding of the vehicle extracted by the device, and
control the vehicle with respect to the extracted information or to output a warning signal if the information meets a predetermined condition.

20. The vehicle according to claim 19, wherein the dynamic information represents a position and a movement of objects in a surrounding of the vehicle.

* * * * *